US010624127B2

(12) United States Patent
Jonsson et al.

(10) Patent No.: US 10,624,127 B2
(45) Date of Patent: Apr. 14, 2020

(54) EFFECTIVE TRANSMISSION SCHEDULING IN A DISTRIBUTED ANTENNA SYSTEM

(71) Applicant: Telefonaktiebolaget LM Ericsson (publ), Stockholm (SE)

(72) Inventors: Mikael Jonsson, Vällingby (SE); Carola Faronius, Järfälla (SE); Magnus Finne, Sundbyberg (SE); Ola Persson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/085,386

(22) PCT Filed: Mar. 17, 2016

(86) PCT No.: PCT/SE2016/050220
§ 371 (c)(1),
(2) Date: Sep. 14, 2018

(87) PCT Pub. No.: WO2017/160196
PCT Pub. Date: Sep. 21, 2017

(65) Prior Publication Data
US 2019/0090274 A1    Mar. 21, 2019

(51) Int. Cl.
*H04W 74/08* (2009.01)
*H04B 7/024* (2017.01)
(Continued)

(52) U.S. Cl.
CPC ........ *H04W 74/0808* (2013.01); *H04B 7/024* (2013.01); *H04L 1/1812* (2013.01);
(Continued)

(58) Field of Classification Search
None
See application file for complete search history.

(56) References Cited

U.S. PATENT DOCUMENTS

| | | | | |
|---|---|---|---|---|
| 2004/0185904 A1* | 9/2004 | Yamakita | ............. | H04B 7/0608 455/560 |
| 2005/0009475 A1* | 1/2005 | Hwang | ................. | H04B 7/061 455/100 |

(Continued)

OTHER PUBLICATIONS

International Search Report and Written Opinion dated Nov. 22, 2016 issued in International Application No. PCT/SE2016/050220. (11 pages).

*Primary Examiner* — Eunsook Choi
(74) *Attorney, Agent, or Firm* — Sage Patent Group

(57) ABSTRACT

A method includes a base station in a distributed antenna system having a set of antennas. For each antenna, the base station stores state information indicating that the antenna is either in a transmit state or a do_not_transmit state. For each antenna indicated by the state information for the antenna as being in the transmit state, the base station determines whether the antenna has been given a clear channel indication (CCI) for a next transmission time interval (TTI). At the next TTI, the base station transmits data to a UE, wherein the base station transmits the data to the UE using antennas included in said set of antennas that i) are indicated by the state information for the antenna as being in the transmit state and ii) have been given the CCI. The base station adjusts the state information in accordance with a transmit status.

20 Claims, 9 Drawing Sheets

(51) Int. Cl.
*H04W 88/08* (2009.01)
*H04L 1/18* (2006.01)
*H04W 16/14* (2009.01)
*H04W 88/10* (2009.01)

(52) U.S. Cl.
CPC ......... *H04W 16/14* (2013.01); *H04W 88/085* (2013.01); *H04W 88/10* (2013.01)

(56) References Cited

U.S. PATENT DOCUMENTS

| | | | |
|---|---|---|---|
| 2012/0134279 A1* | 5/2012 | Tamaki | H04B 7/024 370/248 |
| 2013/0100875 A1* | 4/2013 | Chun | H04L 25/03904 370/312 |
| 2013/0154889 A1* | 6/2013 | Desclos | H01Q 9/06 343/745 |
| 2013/0237141 A1 | 9/2013 | Hong | |
| 2016/0112881 A1* | 4/2016 | Duan | H04L 43/16 455/422.1 |
| 2017/0347270 A1* | 11/2017 | Iouchi | H04W 16/14 |

* cited by examiner

EFFECTIVE TRANSMISSION SCHEDULING IN A DISTRIBUTED ANTENNA SYSTEM

CROSS REFERENCE TO RELATED APPLICATION(S)

This application is a 35 U.S.C. § 371 National Stage of International Patent Application No. PCT/SE2016/050220, filed Mar. 17, 2016, designating the United States.

TECHNICAL FIELD

Disclosed herein are, for example, methods and network nodes for effective transmission scheduling in a distributed antenna system (DAS).

BACKGROUND

Today, cellular operators are tasked with utilizing more spectrum to address the increasing demand for mobile data. Cellular operators are increasingly interested in the use of Long Term Evolution (LTE) on an unlicensed spectrum (i.e., LTE-U or license assisted access (LAA)) due to the availability of large amounts of bandwidth.

A distributed antennas system (DAS) is a way to deal with isolated spots of poor coverage inside a large building by installing several relatively small antennas throughout the building. The antennas are physically connected to a central controller, which is connected to the wireless carrier network's base station. Typically, in systems that utilize a number of antennas, the same signal is sent from all of the antennas without taking into account antenna deployment and the position of the wireless communication device (WCD) (also referred to as user equipment (UE)) for which the signal is intended. When a DAS deployment with LTE is operating on unlicensed frequencies, it is further required that, before a signal is transmitted, a Clear Channel Assessment (CCA) is performed to allow transmission from a specific antenna. That is, an antenna of a DAS is used to transmit a signal only when the antenna has received an indication that the channel on which the antenna is configured to transmit the signal (the "operating channel") is clear (e.g., no other system is using the channel or the channel is free of noise). Such a clear channel indication is referred to as a "successful CCA." Antennas without a successful CCA are muted (e.g., not used to transmit the signal). CCA involves a receiver detecting energy (e.g., noise or traffic) in the operating channel and backing off a data transmission when, for example, traffic or excessive noise is detected (i.e., a clear channel is not indicated), thereby avoiding interference.

Unlicensed spectrums allow mobile operators to boost coverage in their cellular networks by using the unlicensed band already populated by Wi-Fi devices. While the operators ordinarily rely on the radio spectrum to which they have exclusive licenses, LTE-U shares space with Wi-Fi equipment such as smartphones and laptops already using that band.

If scheduling of a UE is performed without taking into account a position of the UE within the DAS, a number of disadvantageous and unwanted scenarios will occur. For example, in a traditional DAS, operating on a licensed LTE Band (e.g., no CCA required for an individual antenna to be allowed to transmit) a major drawback is that a UE will potentially be scheduled using antennas which do not provide coverage at the position where the UE is located. Such transmissions do not improve the radio link for that particular UE, but instead, contributes to an increase in radio network interference, which adversely impacts network capacity and performance.

In another example, the CCA requirement used in the unlicensed spectrum adds complexity to the network. For example, in the most basic solution in unlicensed spectrums, a certain UE is scheduled as soon as any antenna in the system has received a successful CCA. However, since there is no knowledge regarding whether a particular UE is in the coverage area of the antenna(s) which have a successful CCA, there is a probability that the UE will not be reached by the transmission, triggering retransmissions, and in a worst case, eventually leading to stalling and radio link failure. These rudimentary solutions put very high and unwanted requirements on the actual physical installation of the DAS.

Furthermore, in the DAS, it is not feasible to have one or a few antennas in the system where the radio environment differs too much from the rest of the antennas. For example, in a case where one antenna is installed in a basement while the rest are installed on higher floors in a building (FIG. 1(A)), the radio environment may be good (triggering successful CCA) in the basement while the radio environment higher up in the building will be worse. This scenario results in that UEs on higher floors will be scheduled only on an antenna that cannot be heard by the UE leading to the unwanted effects previously discussed. A similar situation arises in a corridor (FIG. 1(B)) where radio conditions may vary at different parts of the corridor.

SUMMARY

According to some embodiments, a method is performed by a base station in a distributed antenna system having a set of antennas, where the set of antennas includes at least a first antenna and a second antenna. The method includes, for each antenna included in said set of antennas, the base station storing for the antenna state information indicating that the antenna is either in a transmit state or a do_not_transmit state. The method further includes, for each antenna indicated by the state information for the antenna as being in the transmit state, the base station determining whether the antenna has been given a clear channel indication (CCI) for a next transmission time interval (TTI). The method further includes, at the next TTI, the base station transmitting data to a UE, where the base station transmits the data to the UE using antennas included in said set of antennas that i) are indicated by the state information for the antenna as being in the transmit state and ii) have been given the CCI, such that the base station does not use any of the other antennas included in said set of antennas to transmit the data. The method further includes the base station receiving a transmit status indicating whether the data transmission to the UE was successful. The method also includes the base station adjusting the state information in accordance with the transmit status.

According to some embodiments, a base station in a distributed antenna system has a set of antennas that include at least a first antenna and a second antenna. The base station includes a processor and a computer readable medium coupled to the processor, where the computer readable medium contains instructions executable by the processor. The base station is operative to for each antenna included in said set of antennas, store for the antenna state information indicating that the antenna is either in a transmit state or a do_not_transmit state. The base station is further operative to, for each antenna indicated by the state information for the antenna as being in the transmit state, determine whether the antenna has been given a clear channel indication (CCI) for a next transmission time interval (TTI). The base station is further operative to, at the next TTI, transmit data to a UE, where the base station transmits the data to the UE using antennas included in said set of antennas that i) are indicated by the state information for the antenna as being in the transmit state and ii) have been given the CCI, such that the base station does not use any of the other antennas included in said set of antennas to transmit the data. The base station is further operative to receive a transmit status indicating whether the data transmission to the UE was successful. The base station is further operative adjust the state information in accordance with the transmit status.

BRIEF DESCRIPTION OF THE DRAWINGS

The accompanying drawings, which are incorporated herein and form part of the specification, illustrate various embodiments.

DETAILED DESCRIPTION

Figure 1:
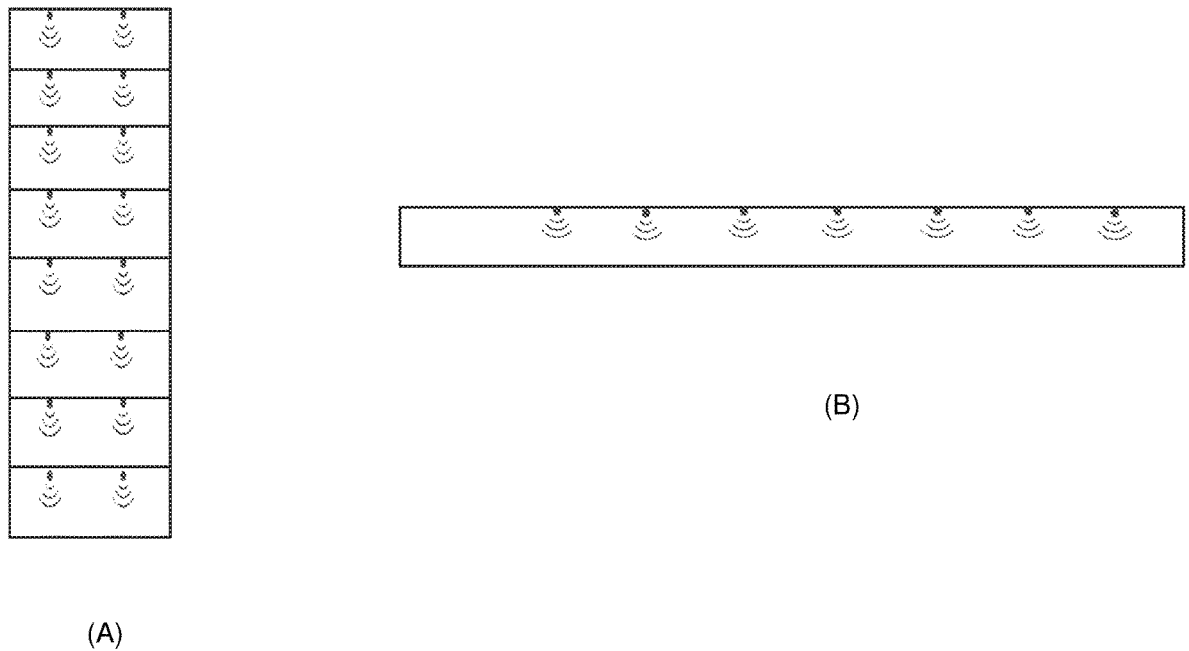
FIG. 1A illustrates a DAS in a high-rise building.
FIG. 1B illustrates a DAS in a corridor.

According to some embodiments, positioning of UEs (radio wise) is taken into account within the DAS, which enables a more effective scheduling over the air. Radio wise positioning provides identification of which antenna(s) provide coverage to the UE in its current position. The positioning may be based on a Hybrid Automatic Repeat Request (HARQ) feedback in combination with knowledge about which antennas had a clear channel indication (e.g., a successful Clear Channel Assessment (CCA)) for a transmission in a certain TTI. In some embodiments, an antenna receives a clear channel indication (CCI) when a signal level on the channel used by the antenna is measured below a predetermined threshold for a predetermined period of time. Accordingly, in some embodiments, a node connected to the antennas of the DAS determines, for each antenna, the power level of a signal received via the antenna and determines whether the antenna should receive a CCI based on the power level.

In some embodiments, state information is stored for each antenna in the DAS. The state information indicates the antenna being in one of a "transmit" state and a "do_not_transmit" state. This state information may be used to derive a mask having a string of bits that correspond to a respective antenna, where a '1' indicates that the antenna is in the transmit state, and a '0' indicates that the antenna is in the do_not_transmit state. Furthermore, other information such as a signal-to-interference-plus-noise-ratio and an energy detection threshold can be used to determine which antennas to use for transmitting to the UE.

In some embodiments, the mask indicates which antennas had a CCI and were transmitting when a transmission to the UE was successful. In some embodiments, for upcoming TTIs, only antennas included in the mask for which a CCI is provided will trigger scheduling of the same UE.

According to some embodiments, at the first transmission to a new UE, the "mask" is reset (i.e., the state of each antenna is set to "transmit"), where all antennas with a CCI are used to transmit a signal to the UE and the transmission is evaluated using HARQ feedback. When there is a successful transmission (e.g., the UE responds to the signal by transmitting an ACK), bits in the mask representing antennas which did not get a CCI may be cleared (i.e., set to 0) and not used for an up-coming TTI. When there is an unsuccessful transmission, bits representing antennas that did get a CCI may be cleared. If it is determined that the whole mask is cleared, i.e. no antenna candidates for next TTI because all of the antennas are in the do_not_transmit state, the mask may be reset (i.e., all bits in mask set to 1 indicating that all antennas are now in the transmit state).

When there are repeated unsuccessful transmissions to a UE, the mask may be reset (i.e., all bits in mask set to 1) to temporarily consider all antennas again. In some embodiments, to achieve a less aggressive behavior, it can be required that a number of unsuccessful transmissions must occur before an antenna's state is changed to do_not_transmit. In some embodiments, when there are repeated consecutive failures, as well as repeated TTIs where the UE is not scheduled due to none of the antennas in the transmit state receiving a CCI, the algorithm may restart where the mask is reset to consider all antennas again.

Figure 2:
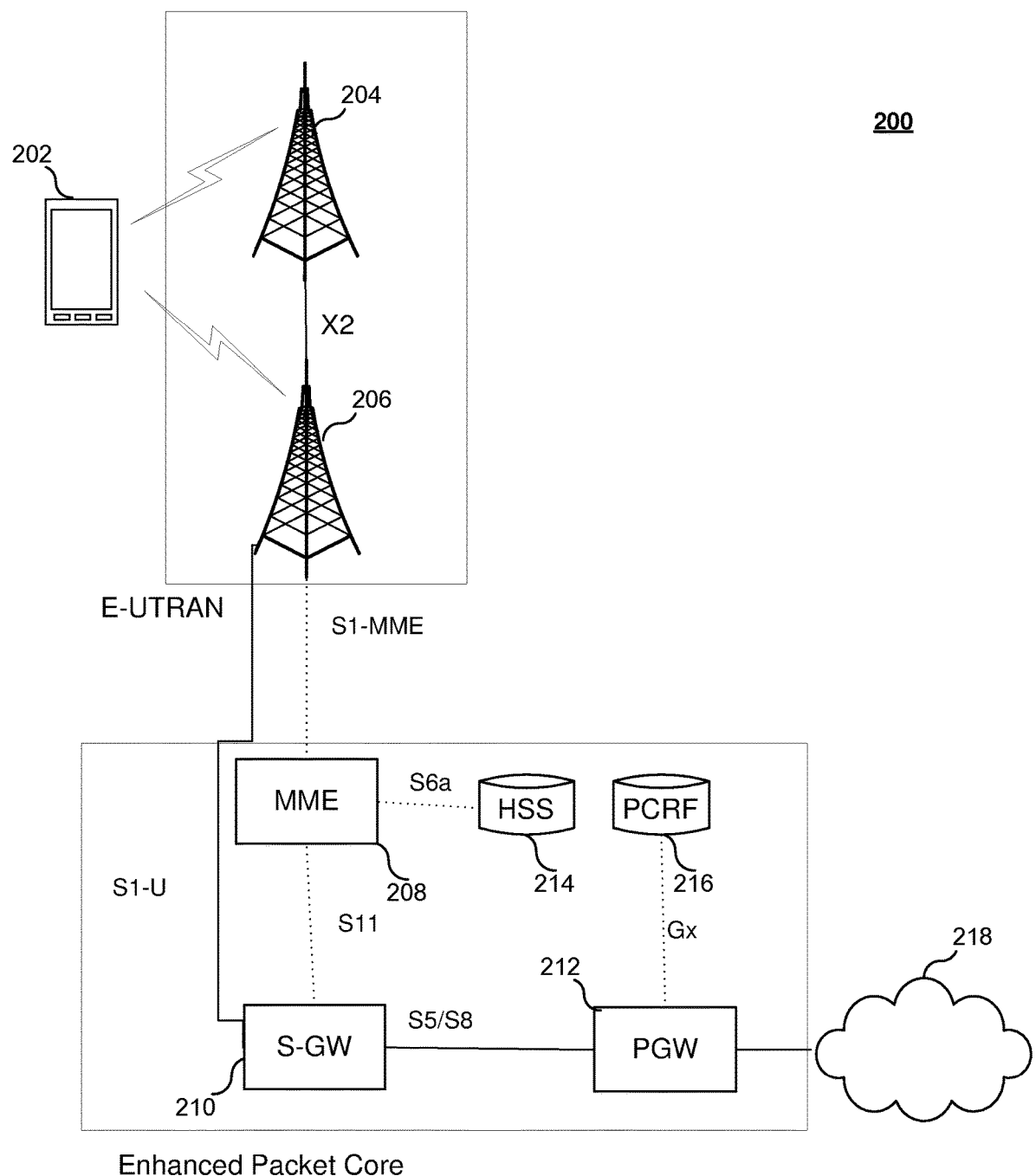
FIG. 2 illustrates an exemplary wireless communication system according to some embodiments.

FIG. 2 illustrates an embodiment of a wireless communication system 200. The system includes an E-UTRAN and an enhanced packet core (EPC). One or more UEs 202 may be in communication with eNBs 204 and 206 in the E-UTRAN. The UEs include, but are not limited to, mobile telephones, personal digital assistants, electronic readers, and portable electronic tablets.

The E-UTRAN includes base stations (e.g. eNBs) 204 and 206, providing the E-UTRAN user plane (PDCP/RLC/MAC/PHY) and control plane (RRC) protocol terminations towards the UE 202. The eNBs 204 and 26 are interconnected with each other by means of the X2 interface. The eNBs are also connected by means of the S1 interface to the EPC, more specifically to a Mobility Management Entity (MME) 208 by means of the S1-MME interface and to the Serving Gateway (S-GW) 210 by means of the S1-U interface. The MME 208 is connected to a Home Subscriber Server (HSS) 214 by means of a S6a interface. The S-GW 208 is connected to a Packet Data Network Gateway (PGW) 212 by means of a S5/S8 interface. The PGW 212 is connected to a Policy and Charging Rules Function (PCRF) node 216 via a Gx interface. Additionally, the PGW 212 is connected to a network such as the Internet.

Figure 3:
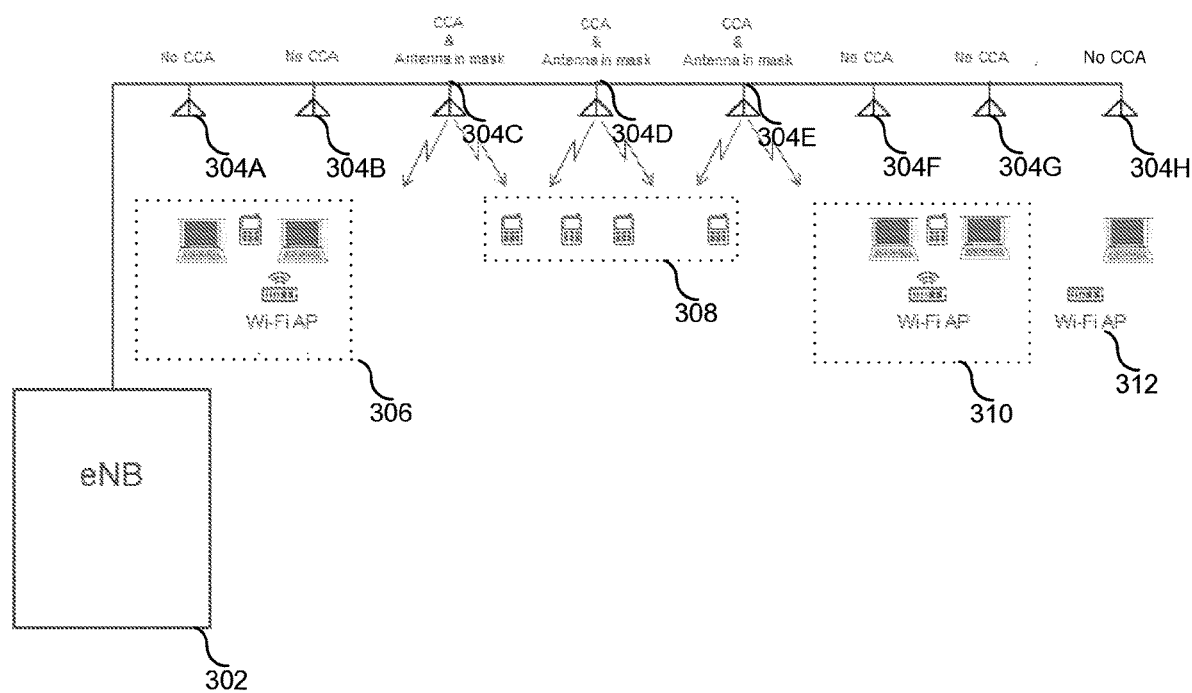
FIG. 3 illustrates a DAS according to some embodiments.

FIG. 3 illustrates an embodiment of a distributed antenna system (DAS) 300. The system may include an eNB 302 that has antennas 304A-304H. Additionally, Wi-Fi access points 306, 310, and 312 are provided. As illustrated in FIG. 3, antennas 304C, 304D, and 304E are "in the mask" (i.e., bit in mask set to '1' to indicate transmit state) and have received a CCI while antennas 304A, 304B, 304F, 304G, and 304H have not received a CCI. Accordingly, in some embodiments, only antennas 304C, 304D, and 304E are scheduled to transmit to UEs such as the group of UEs 308.

Figure 4:
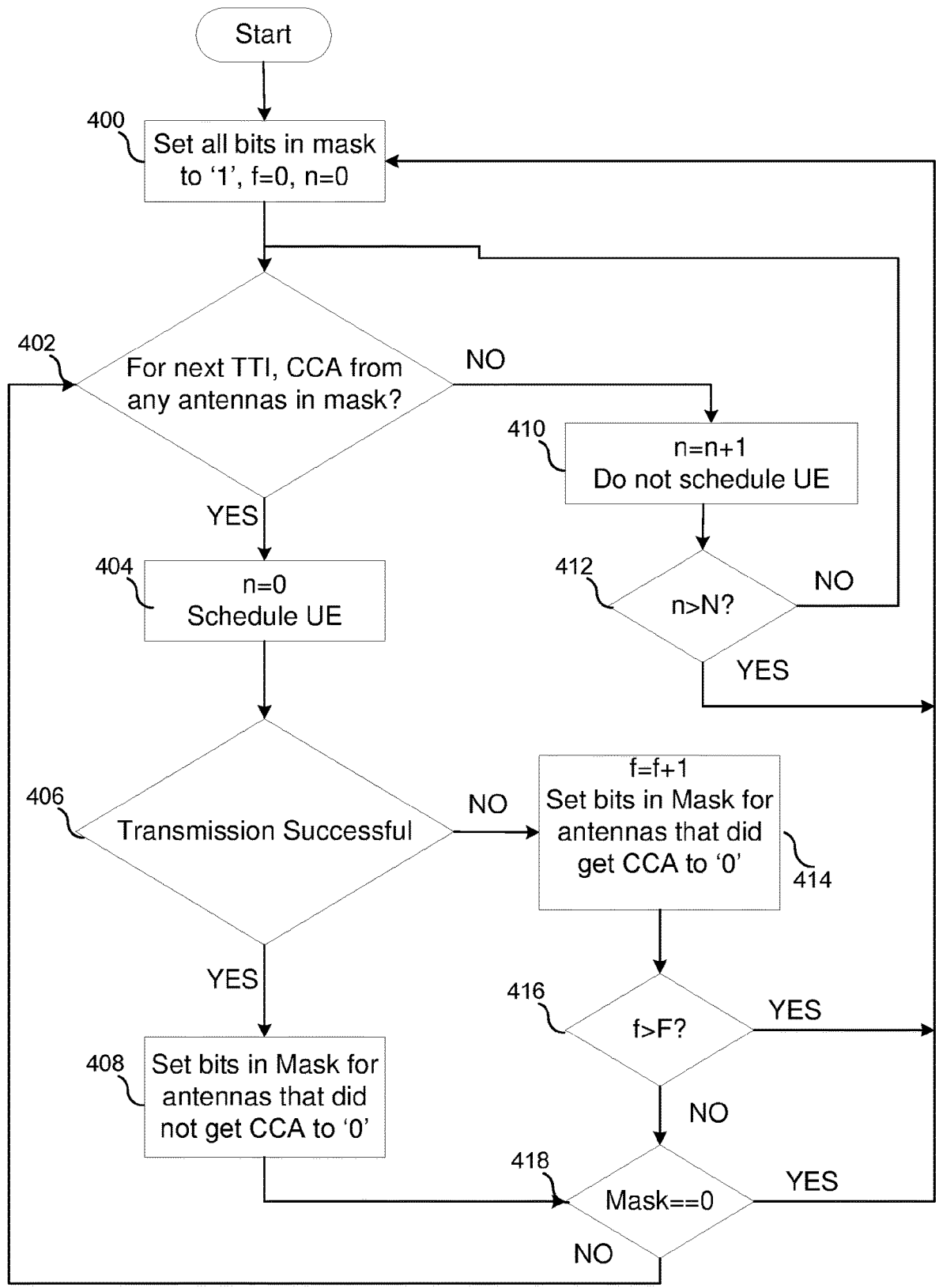
FIG. 4 illustrates a flow chart according to exemplary embodiments.

FIG. 4 illustrates an embodiment of a process performed by a base station such as eNBs 204 and 206 in FIG. 2. The process may generally start at step 400, where all bits in a mask are set to a transmit state (e.g., '1'), and parameters 'f' and 'n' are set to zero. The parameter 'f' may represent a number of consecutive failures for a data transmission to the UE. The parameter 'n' may represent a number of consecutive TTI's for which the UE is not scheduled to received data (e.g., did not get successful CCA for any antenna in the mask).

In step 402, it is determined, for a next transmission time interval (TTI), whether there is a CCI for any antennas in the mask. For example, if there are 5 antennas in a DAS, and 3 of the antennas are set to the transmit state (e.g., 3 antennas have a '1' in the mask), the CCI is checked for only these three antennas (i.e., CCA is only started on antennas that have its bit set to '1' in the mask). If at least one CCI is provided for an antenna in the mask, the process proceeds to step 404 where the parameter 'n' is set to zero and the UE is scheduled for data transmission. In step 406, it is determined whether the data transmission is successful. As an example, a data transmission is successful if an acknowledgement signal (e.g., HARQ feedback) received by the base station indicates that the data transmission was successful. If the data transmission was successful, the process proceeds to step 408 where the bits in the mask for antennas that did not get the CCI are set to a do_not_transmit state (e.g., '0').

In step 402, if it is determined that no CCI is provided for any antennas in the mask, the process proceeds to step 410 where parameter 'n' is incremented by 1 and no UE is scheduled to receive a data transmission. In step 412, it is determined whether the parameter 'n' is above the threshold N, which represents a maximum number of consecutive TTIs where the UE was not scheduled to receive data. If it is determined that the parameter 'n' is not above the threshold N, the process to returns to step 402. However, if it is determined that the parameter 'n' is above N, the process returns to step 400.

In step 406, if it is determined that the data transmission to the UE is not successful, the parameter 'f' is incremented by 1, and the bits in the mask for antennas that did get the CCI are set to the do_not_transmit state (e.g., '0'). In step 416 it is determined whether the parameter 'f' is above the threshold F, which represents a maximum allowed number of consecutive data transmission failures. If it is determined that the parameter 'f' is above the threshold F, the process returns to step 400. If it is determined that the parameter 'f' is not above the threshold F, the process proceeds to 418 where it is determined whether all bits in the mask are set to the do_not_transmit state (e.g. all bits in the mask are '0'). If all bits in the mask are in the do no transmit state, the process returns to step 400. If at least one bit in the mask is not in the do_not_transmit state, the process returns to step 402. Furthermore, the process illustrated in FIG. 4 may use an SINR or energy detection threshold to determine, which antennas to use for transmitting data to the UE.

Figure 5:
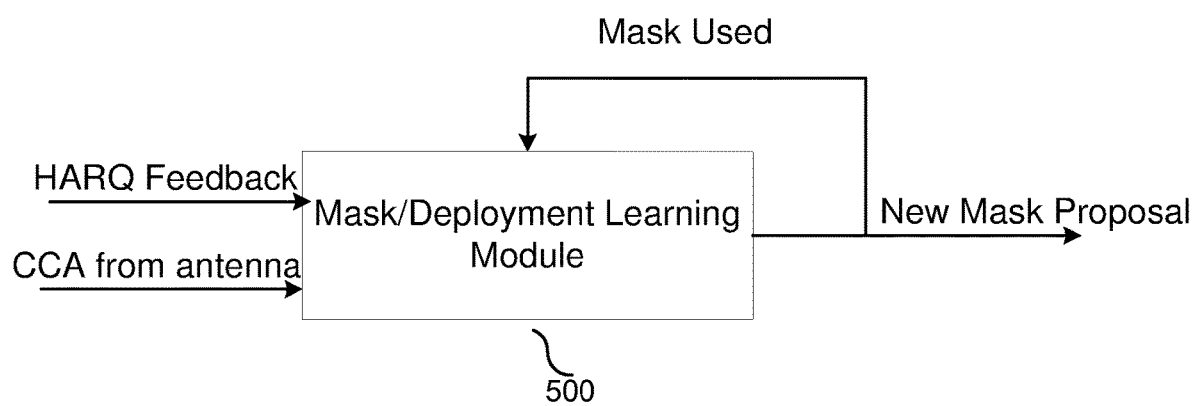
FIG. 5 illustrates a learning module according to exemplary embodiments.

According to some embodiments, a long term learning module (according to the radio wise deployment) can be setup. FIG. 5 illustrates an embodiment of a learning module 500. A learning module improves performance by using antennas in an optimal manner. The learning module can recognize what deployment is used. By knowing what deployment is used, it is also possible to know antennas that should be used together (e.g., some antennas may be grouped together in a commonly used mask). In some embodiments, the learning module 500 receives as input the HARQ feedback, the CCA from an antenna, and a previous mask used to output a new mask.

In some embodiments, if a certain mask is used often, then this mask can be a good general mask alternative for other transmissions. Furthermore, if a certain CCA mask is never used, this mask is probably a bad alternative for all transmissions. As an example, if it is determined that a mask is used for data transmissions a predetermined number of times and receives a high percentage of HARQ ack (i.e., percentage of successful data transmissions exceeds a predetermined threshold), then this mask may be used instead of setting all bits in the initial mask to the transmit state. Furthermore, in some embodiments, if a mask does not have a successful data transmission a predetermined number of times, an error report or alarm may be generated to indicate that there is an issue with the antennas in the mask, and also, the process illustrated in FIG. 4 may not use this mask.

According to some embodiments, a geographical deployment may be learned from long time CCA information. CCA information may provide good new information that could be used for deployment learning. For example if two antennas always have the same CCA pattern (e.g., receive CCI at the same time for a predetermined number of times), it is likely that these antennas are in the same geographical area. By using CCA information from antennas over a period of time (e.g., a predetermined number of iterations of the process illustrated in FIG. 4), a pattern analysis can be performed to identify a geometrical model. Furthermore, HARQ feedback and additional information such as an energy detection threshold, and signal-to-interference-plus-noise-ratio for data transmissions for determining which antennas to use. This deployment model can be used to allocate the proposed new mask. The information that antennas are deployed together can be used for making the mask used more robust and handle also UE movement between antennas.

Figure 6:
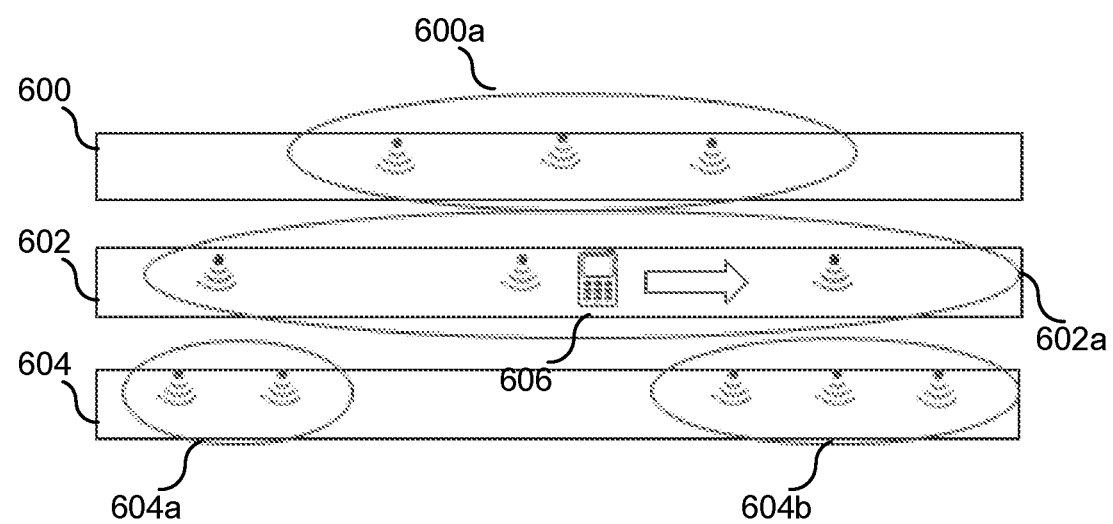
FIG. 6 illustrates a deployment of the learning module according to exemplary embodiments.

FIG. 6 illustrates an example grouping of antennas. As illustrated in FIG. 6, a building includes a first floor 600, a second floor 602, and a third floor 604. The first floor 600 includes a group 600a of three antennas. The second floor 602 includes a group 602a of three antennas. The third floor 604 includes a first group 604a and a second group 604b. As illustrated in FIG. 6, a UE 606 is on the second floor 602. Accordingly, in some embodiments, the UE can receive data transmissions simultaneously from, and simultaneously transmit to, each antenna in the group 602a.

Figure 7:
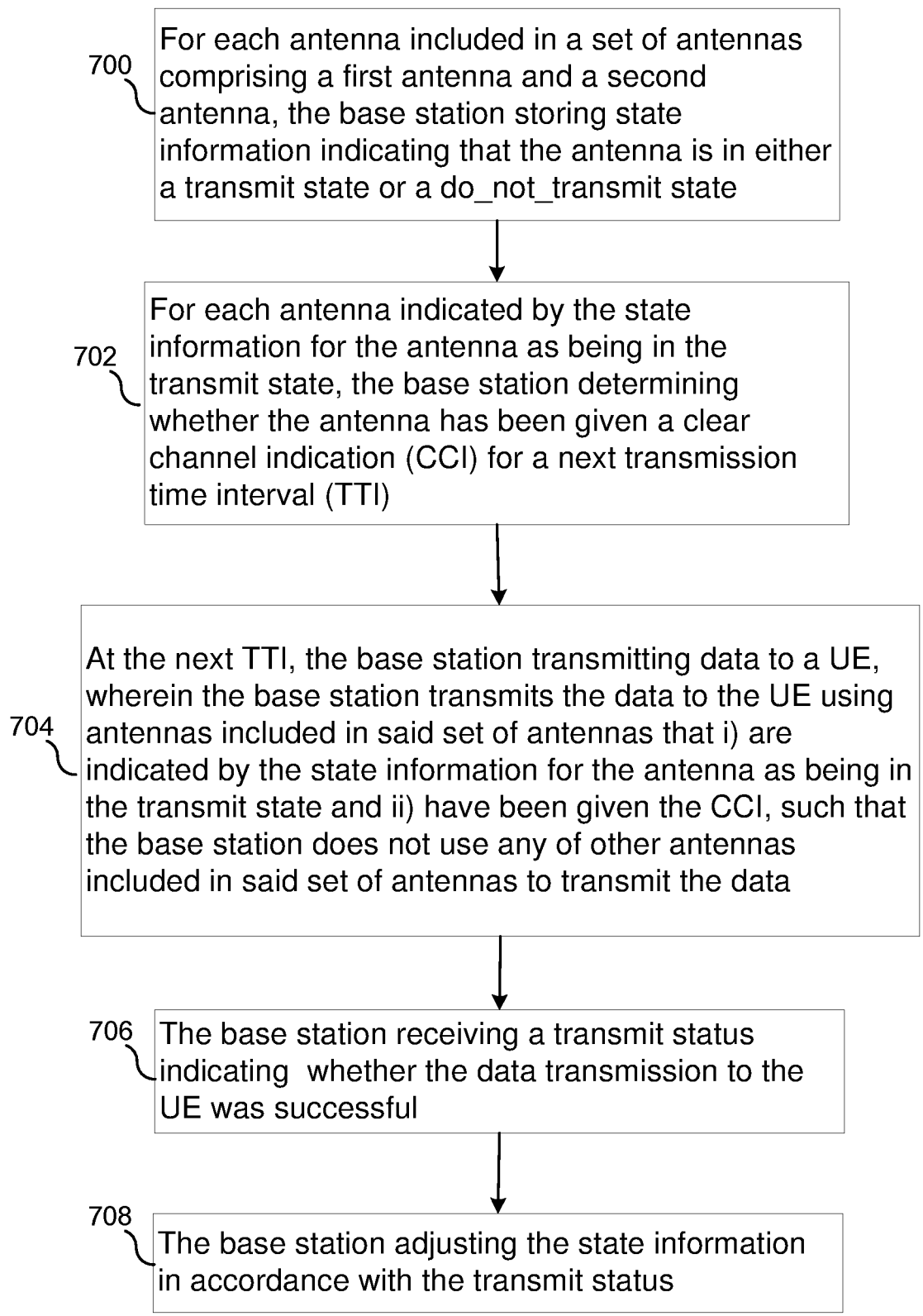
FIG. 7 illustrates a flow chart according to exemplary embodiments.

FIG. 7 illustrates an embodiment of a process performed by the base station in a distributed antenna system having a set of antennas. The process may start at step 700 where, for each antenna included in said set of antennas, the base station stores for the antenna state information indicating that the antenna is either in a transmit state or a do_not_transmit state. In step 702, for each antenna indicated by the state information for the antenna as being in the transmit state, the base station determines whether the antenna has been given a CCI for a next transmission time interval (TTI).

In step 704, at the next TTI, the base station transmits data to a UE, where the base station transmits the data to the UE using antennas included in the set of antennas that i) are indicated by the state information for the antenna as being in the transmit state and ii) have been given the CCI, such that the base station does not use any of the other antennas included in said set of antennas to transmit the data. In step 706, the base station receives a transmit status indicating whether the data transmission to the UE was successful. In step 708, the base station adjusts the state information in accordance with the transmit status.

In some embodiments, in response to determining that the transmit status indicates that the data transmission to the UE is successful, the base station changes, for each antenna that did not receive the CCI, the state information from the transmit state to the do_not_transmit state.

In some embodiments, in response to determining that the transmit status indicates that the data transmission to the UE was not successful, the base station changes, for each antenna that did receive the CCI, the state information from the transmit state to the do_not_transmit state.

In some embodiments, in response to determining that the CCI was not received for any antenna in said set, the base station increments by one a parameter N that represents a number of consecutive TTIs that the UE is not scheduled to receive data from the base station; and in response to determining that parameter N exceeds a predetermined threshold, the base station sets the state information for each antenna to the transmit state.

In some embodiments, in response to determining that the CCI has been received for at least one antenna, the base station sets the parameter N to zero.

In some embodiments, in response to determining that the transmit status indicates that the data transmission to the UE was not successful, the base station increments by one a parameter F that represents a consecutive number of times that the data transmission to the UE was not successful; and in response to determining that the parameter F exceeds a predetermined threshold, the base station sets the state information for each antenna to the transmit state.

In some embodiments, in response to determining that the parameter F does not exceed the predetermined threshold, the base station determines whether the state information for each antenna is in the do_not_transmit state; and in response to determining that each antenna is in the do_not_transmit state, the base station setting the state information for each antenna to the transmit state.

In some embodiments, the channel between the base station and the UE is on an unlicensed spectrum. In some embodiments, the station information is stored as a mask having a set of bits corresponding to a respective antenna in said set of antennas.

In some embodiments, in response to determining that the transmit status indicates that the data transmission to the UE was successful, the base station deselects each antenna that did not receive the CCI in response to determining that a signal-to-interference-plus-noise ratio associated with the data transmission is above a predetermined threshold.

In some embodiments, in response to determining that the transmit status indicates that the data transmission to the UE was successful, the base station does not deselect each antenna that did not receive the CCI in response to determining that a detected energy level during a clear channel assessment (CCA) is below a predetermined threshold.

In some embodiments, the first antenna and the second antennas are associated in the same group in response to determining that the first and second antennas receive the CCI at a same time for a predetermined number of times, and the first and second antennas in the same group transmit data and receive data to and from the UE, respectively, at the same time.

In some embodiments, the base station generates an error report or alarm in response to determining a mask has not had a successful data transmission a predetermined number of times. In some embodiments, the base station does not use the mask associated with the error report or alarm.

In some embodiments, in response to determining that a mask receives a transmit status indicating a successful data transmission a predetermined number of times, the base station reuses the mask for a first transmission to a new UE.

The embodiments disclosed herein provide the significantly advantageous features of scheduling a particular UE only if one or more of the antennas providing coverage to the UE are allowed to transmit (e.g., successful CCA) which maximizes performance for the particular UE as well as for the system since the amount of failed transmissions are minimized. Furthermore, since a UE will only be scheduled over the air using antennas which provide coverage to the UE (and not all antennas in the DAS) the interference level in the network is minimized, which boosts overall network performance and capacity and thus, increases the possibility for other systems operating on the same frequency to get access to the channel. Furthermore, the embodiments disclosed herein provide less strict requirements on the physical installation of the DAS.

Figure 8:
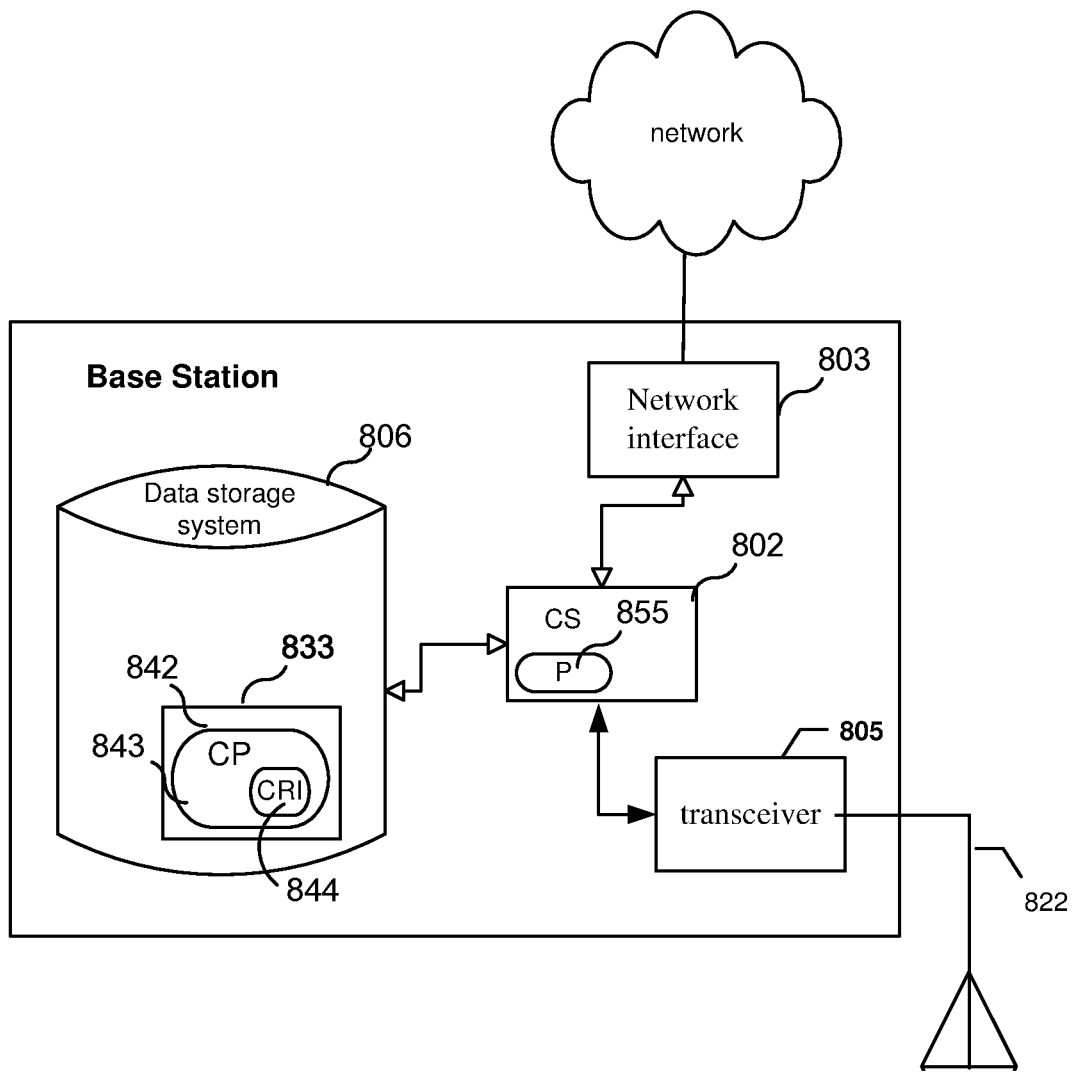
FIG. 8 illustrates a block diagram of a base station according to exemplary embodiments.

FIG. 8 illustrates a block diagram of an exemplary base station such as eNB 204 and 206 in FIG. 2. As shown in FIG. 8, the network node may include or consist of: a computer system (CS) 802, which may include one or more processors 855 (e.g., a general purpose microprocessor) and/or one or more circuits, such as an application specific integrated circuit (ASIC), field-programmable gate arrays (FPGAs), a logic circuit, and the like; a network interface 803 for use in connecting the network node to a network; and a data storage system 806, which may include one or more non-volatile storage devices and/or one or more volatile storage devices (e.g., random access memory (RAM)). In embodiments where the network node includes a processor 855, a computer program product (CPP) 833 may be provided. CPP 833 includes or is a computer readable medium (CRM) 842 storing a computer program (CP) 843 comprising computer readable instructions (CRI) 844. CRM 842 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 844 of computer program 843 is configured such that when executed by computer system 802, the CRI causes the network node to perform steps described above (e.g., steps described above with reference to the flow charts and message flows shown in the drawings). In other embodiments, the network node may be configured to perform steps described herein without the need for a computer program. That is, for example, computer system 802 may consist merely of one or more ASICs. Hence, the features of the embodiments described herein may be implemented in hardware and/or software.

Figure 9:
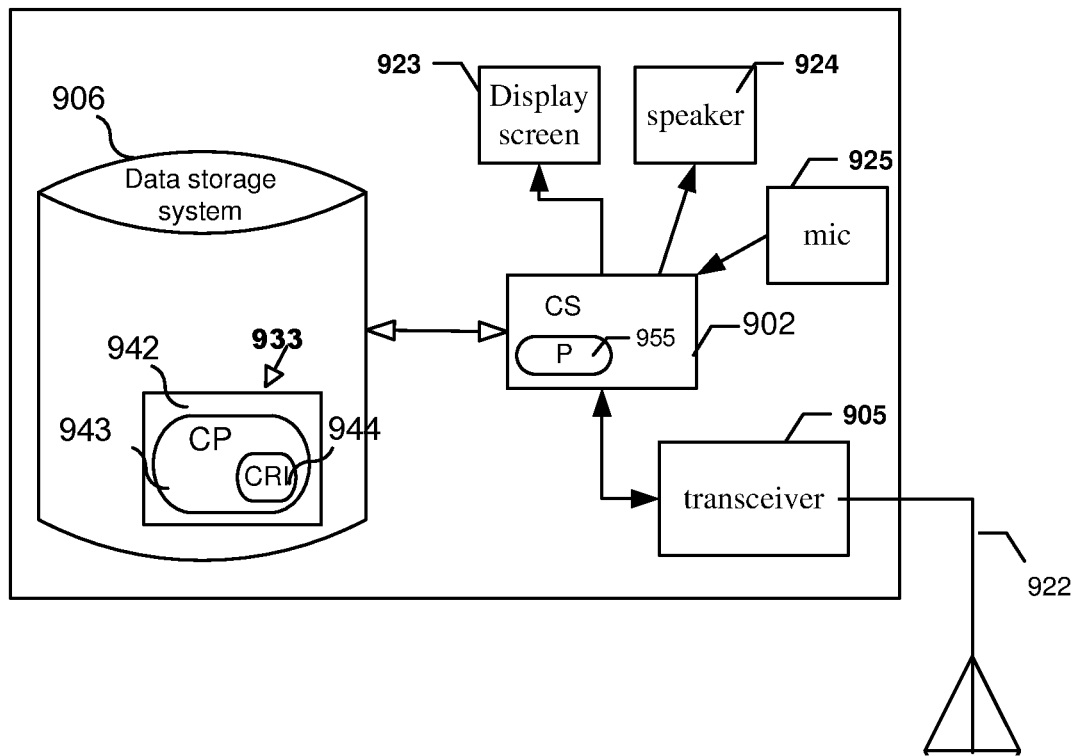
FIG. 9 illustrates a block diagram of a UE according to exemplary embodiments.

FIG. 9 is a block diagram of a UE according to some embodiments. As shown in FIG. 9, the UE may include or consist of: a computer system (CS) 902, which may include one or more processors 955 (e.g., a general purpose microprocessor) and/or one or more circuits, such as an application specific integrated circuit (ASIC), field-programmable gate arrays (FPGAs), a logic circuit, and the like; a transceiver 905, coupled to an antenna, 922 for transmitting and receiving data wireless; and a data storage system 906, which may include one or more non-volatile storage devices and/or one or more volatile storage devices (e.g., random access memory (RAM)). In embodiments where the UE includes a processor 955, a computer program product (CPP) 933 may be provided. CPP 933 includes or is a computer readable medium (CRM) 942 storing a computer program (CP) 943 comprising computer readable instructions (CRI) 944. CRM 942 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 944 of computer program 943 is configured such that when executed by computer system 902, the CRI causes the UE to perform steps described above (e.g., steps described above with reference to the flow charts and message flows shown in the drawings). In other embodiments, the UE may be configured to perform steps described herein without the need for a computer program. That is, for example, computer system 902 may consist merely of one or more ASICs. Hence, the features of the embodiments described herein may be implemented in hardware and/or software. As shown in FIG. 9, UE may include: a display screen 933, a speaker 924, and a microphone ("mica"), all of which are coupled to CS 902.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Abbreviations

3 GPP 3rd Generation Partnership Project
CCA Clear Channel Assessment
DAS Distributed Antenna System
eNB Evolved Node B
HARQ Hybrid Automatic Repeat request
HSS Home Subscriber Server
LAA License Assisted Access
LTE Long Term Evolution
LTE-U LTE-Unlicensed
MME Mobility Management Entity
PCRF Policy and Charging Rules Function
PGW Packet Data Network (PDN) Gateway
SGW Serving Gateway Node
TTI Transmission Time Interval
UE User Equipment

The invention claimed is:

1. A method performed by a base station in a distributed antenna system having a set of antennas said set of antennas comprising at least a first antenna and a second antenna, the method comprising:
    for each antenna included in said set of antennas, the base station storing state information for the antenna indicating that the antenna is either in a transmit state or a do_not_transmit state;
    for each antenna indicated by the state information for the antenna as being in the transmit state, the base station determining whether the antenna has been given a clear channel indication (CCI) for a next transmission time interval (TTI);
    at the next TTI, the base station transmitting data to a UE, wherein the base station transmits the data to the UE using antennas included in said set of antennas that i) are indicated by the state information for the antenna as being in the transmit state and ii) have been given the CCI, such that the base station does not use any of the other antennas included in said set of antennas to transmit the data;
    the base station receiving a transmit status indicating whether the data transmission to the UE was successful; and
    the base station adjusting the state information for the antenna in accordance with the transmit status.

2. The method of claim 1, wherein, in response to determining that the transmit status indicates that the data transmission to the UE is successful, the base station changing, for each antenna that did not receive the CCI, the state information for the antenna from the transmit state to the do_not_transmit state.

3. The method of claim 1, wherein, in response to determining that the transmit status indicates that the data transmission to the UE was not successful, the base station changing, for each antenna that did receive the CCI, the state information for the antenna from the transmit state to the do_not_transmit state.

4. The method of claim 1, further comprising:
    in response to determining that the CCI was not received for any antenna in said set, the base station incrementing by one a parameter N that represents a number of consecutive TTIs that the UE is not scheduled to receive data from the base station; and
    in response to determining that parameter N exceeds a predetermined threshold, the base station setting the state information for each antenna to the transmit state.

5. The method according to of claim 1, further comprising:
    in response to determining that the transmit status indicates that the data transmission to the UE was not successful, the base station incrementing by one a parameter F that represents a consecutive number of times that the data transmission to the UE was not successful; and
    in response to determining that the parameter F exceeds a predetermined threshold, the base station setting the state information for each antenna to the transmit state.

6. The method of claim 1, wherein the station information is stored as a mask having a set of bits corresponding to a respective antenna in said set of antennas.

7. The method of claim 6, wherein in response to determining that a mask receives a transmit status indicating a successful data transmission a predetermined number of times, the base station reuses the mask for a first transmission to a new UE.

8. The method of claim 1, wherein in response to determining that the transmit status indicates that the data transmission to the UE was successful, the method further comprising:
    the base station deselecting each antenna that did not receive the CCI in response to determining that a signal-to-interference-plus-noise ratio associated with the data transmission is above a predetermined threshold.

9. The method of claim 1, wherein in response to determining that the transmit status indicates that the data transmission to the UE was successful, the method further comprising:
    the base station not deselecting each antenna that did not receive the CCI in response to determining that an energy level detected during a clear channel assessment (CCA) is below a predetermined threshold.

10. The method of claim 1, wherein
the first antenna and the second antennas are associated in the same group in response to determining that the first and second antennas receive the CCI at a same time for a predetermined number of times, and
the first and second antennas in the same group transmit data to the UE at the same time.

11. A base station in a distributed antenna system having a set of antennas, said set of antennas comprising at least a first antenna and a second antenna, the base station comprising:
a processor; and
a computer readable medium coupled to the processor, wherein the base station is configured to:
for each antenna included in said set of antennas, store state information for the antenna indicating that the antenna is either in a transmit state or a do_not_transmit state;
for each antenna indicated by the state information for the antenna as being in the transmit state, determine whether the antenna has been given a CCI for a next transmission time interval (TTI);
at the next TTI, transmit data to a UE, wherein the base station transmits the data to the UE using antennas included in said set of antennas that i) are indicated by the state information for the antenna as being in the transmit state and ii) have been given the CCI, such that the base station does not use any of the other antennas included in said set of antennas to transmit the data; and
adjust the state information for the antenna in accordance with the transmit status a received transmit status indicating whether the data transmission to the UE was successful.

12. The base station of claim 11, wherein the base station is further configured such that:
in response to determining that the transmit status indicates that the data transmission to the UE is successful, the base station changes, for each antenna that did not receive the CCI, the state information for the antenna from the transmit state to the do_not_transmit state, and
in response to determining that the transmit status indicates that the data transmission to the UE was not successful, the base station changes, for each antenna that did receive the CCI, the state information for the antenna from the transmit state to the do_not_transmit state.

13. The base station of claim 11, whereby the base station is further configured such that:
in response to determining that the CCI was not received for any antenna in said set, the base station increments by one a parameter N that represents a number of consecutive TTIs that the UE is not scheduled to receive data from the base station;
in response to determining that parameter N exceeds a predetermined threshold, the base station sets the state information for each antenna to the transmit state; and
in response to determining that the CCI has been received for at least one antenna, the base station sets the parameter N to zero.

14. The base station of claim 11, whereby the base station is further operative to:
in response to determining that the transmit status indicates that the data transmission to the UE was not successful, increment by one a parameter F that represents a consecutive number of times that the data transmission to the UE was not successful; and
in response to determining that the parameter F exceeds a predetermined threshold, set the state information for each antenna to the transmit state.

15. The base station of claim 14, whereby the base station is further operative to:
in response to determining that the parameter F does not exceed the predetermined threshold, determine whether the state information for each antenna is in the do_not_transmit state; and
in response to determining that each antenna is in the do_not_transmit state, set the state information for each antenna to the transmit state.

16. The base station of claim 11, wherein the channel between the base station and the UE is on an unlicensed spectrum.

17. The base station of claim 11, wherein the station information is stored as a mask having a set of bits corresponding to a respective antenna in said set of antennas.

18. The base station of claim 11, wherein in response to determining that the transmit status indicates that the data transmission to the UE was successful, the base station is further operative to:
deselect each antenna that did not receive the CCI in response to determining that a signal-to-interference-plus-noise ratio associated with the data transmission is above a predetermined threshold.

19. The base station of claim 11, wherein in response to determining that the transmit status indicates that the data transmission to the UE was successful, the base station is further operative to:
deselect each antenna that did not receive the CCI in response to determining that an energy level detected during a clear channel assessment (CCA) is below a predetermined threshold.

20. The base station of claim 11, wherein
the first antenna and the second antennas are associated in the same group in response to determining that the first and second antennas receive the CCI at a same time for a predetermined number of times, and
the first and second antennas in the same group transmit data to the UE at the same time.

* * * * *